US008007359B2

(12) United States Patent
Yoshizawa

(10) Patent No.: US 8,007,359 B2
(45) Date of Patent: Aug. 30, 2011

(54) GAMING MACHINE AND GAMING METHOD THEREOF

(75) Inventor: Kazumasa Yoshizawa, Tokyo (JP)

(73) Assignee: Universal Entertainment Corporation, Koto-Ku, Tokyo (JP)

( * ) Notice: Subject to any disclaimer, the term of this patent is extended or adjusted under 35 U.S.C. 154(b) by 956 days.

(21) Appl. No.: 11/941,189

(22) Filed: Nov. 16, 2007

(65) Prior Publication Data

US 2008/0132322 A1 Jun. 5, 2008

(30) Foreign Application Priority Data

Nov. 30, 2006 (JP) ................................ 2006-323980

(51) Int. Cl.
*G06F 17/00* (2006.01)

(52) U.S. Cl. ........................................................ 463/20

(58) Field of Classification Search ............... 463/16–25
See application file for complete search history.

(56) References Cited

U.S. PATENT DOCUMENTS

| | | | | |
|---|---|---|---|---|
| 6,517,432 | B1 * | 2/2003 | Jaffe | 463/16 |
| 6,981,635 | B1 * | 1/2006 | Hughs-Baird et al. | 235/375 |
| 7,828,294 | B2 * | 11/2010 | Nicely et al. | 273/146 |
| 2007/0060266 | A1 * | 3/2007 | Kojima | 463/16 |
| 2007/0066391 | A1 * | 3/2007 | Kojima | 463/31 |
| 2007/0238510 | A1 * | 10/2007 | Halprin | 463/20 |

* cited by examiner

*Primary Examiner* — Ronald Laneau
(74) *Attorney, Agent, or Firm* — Banner & Witcoff, Ltd.

(57) ABSTRACT

A gaming environment is described. When a predetermined time is elapsed, spinning reels are stopped and symbols are displayed on symbol display areas. Then, if it is determined that a winning combination will be newly realized in a case where any symbol is displayed on another symbol display area, the symbol is enlarged displayed over plural symbol display areas. And then, an award corresponding to the realized winning combination will be provided.

6 Claims, 8 Drawing Sheets

LINE PAY

| SYMBOL \ OF A KIND | 2 | 3 | 4 | 5 |
|---|---|---|---|---|
|  | 100 | 200 | 300 | 400 |
|  | 50 | 100 | 150 | 200 |
|  | 40 | 80 | 120 | 160 |
|  | 40 | 80 | 120 | 160 |
|  | 20 | 40 | 60 | 80 |
|  | 20 | 40 | 60 | 80 |
|  | | 10 | 20 | 30 |
|  | | 10 | 20 | 30 |
|  | | 5 | 10 | 15 |
|  | | 5 | 10 | 15 |

GAMING MACHINE AND GAMING METHOD THEREOF

CROSS-REFERENCE TO RELATED APPLICATIONS

This application is based upon and claims a priority from the prior Japanese Patent Application No. 2006-323980 filed on Nov. 30, 2006, the entire contents of which are incorporated herein by reference.

BACKGROUND

1. Field

One or more aspects of the invention relate to a gaming machine and a gaming method thereof that provide an award based on a combination of symbols displayed on symbol display areas, more particularly, that newly realize a winning combination by enlarging the symbol(s) displayed on the symbol display area.

2. Description of Related Art

Conventionally, in a slot machine which is a type of gaming machines, when gaming medium such as coin or the like is input, a game is started and symbol rows are variably displayed on a predetermined areas. When a predetermined time is elapsed, the symbol rows are stopped and the award is provided based on the combination of stopped symbols.

Generically, it is determined whether or not the combination, which corresponds to the award to be provided, is realized based on the number of the same symbols (for example, "CHERRY" or "7") displayed on predefined payline. Also, in conventional some slot machines, if a predetermined condition is met, a special symbol, which is different from normal symbols, will be displayed and moved on the display, thereby entertainment will be enhanced. Also, in conventional some slot machines, if the same symbols are adjacently displayed on the symbol display areas, effect image, which uses symbols over the plural symbol display areas, is displayed. Thereby, entertainment will be enhanced.

In above conventional slot machines, each one symbol is displayed on each one symbol display area, whether the slot machines use video reels or mechanical reels. Also, in above conventional slot machines, a size of each symbol display area is determined based on a size of each reel, so sizes of symbols to be displayed on each symbol display area are the almost same.

SUMMARY

One or more aspects invention related to a gaming machine, a gaming method thereof, a computer readable medium having computer-executable instructions or the like which enhance an entertainment with higher visibility. Also, one or more aspects of the present invention, when a predetermined time is elapsed, spinning reels are stopped and symbols are displayed on symbol display areas. Then, if it is determined that a winning combination will be newly realized in a case where any symbol is displayed on another symbol display area, the symbol is enlarged displayed over plural symbol display areas. And then, an award corresponding to the realized winning combination will be provided.

One or more of the above aspects of the invention will be more fully described in the following detailed description when read in connection with the accompanying drawings. It is to be expressly understood, however, that the drawings are for purpose of illustration only and not intended as a definition of the limits of the invention.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

DETAILED DESCRIPTION

Figure 1:
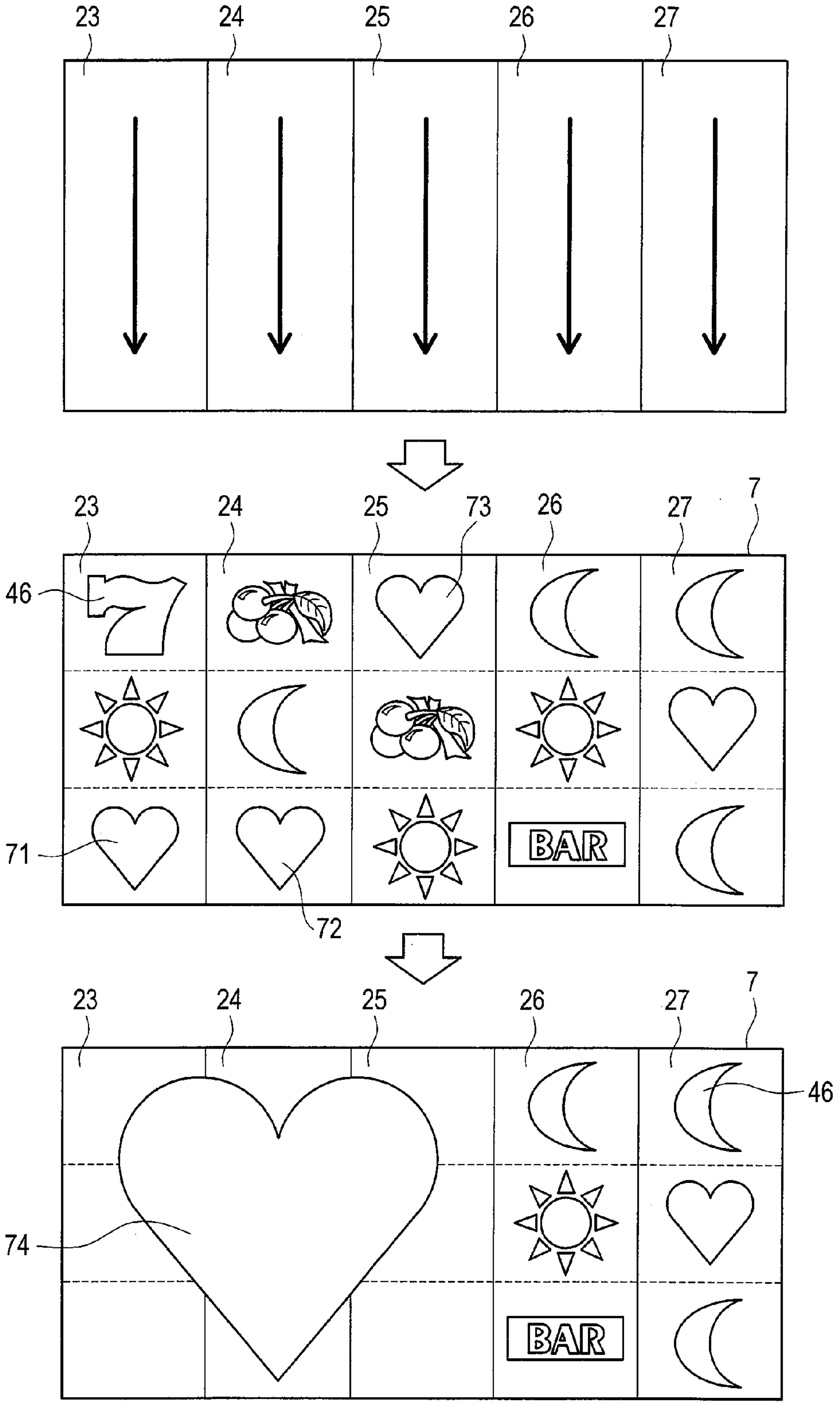
FIG. 1 is a view showing a feature of a slot machine in accordance with one or more aspects of the present invention.

The various aspects summarized previously may be embodied in various forms. The following description shows by way of illustration of various combinations and configurations in which the aspects may be practiced. It is understood that the described aspects and/or embodiments are merely examples, and that other aspects and/or embodiments may be utilized and structural and functional modifications may be made, without departing from the scope of the present disclosure.

It is noted that various connections are set forth between items in the following description. It is noted that these connections in general and, unless specified otherwise, may be direct or indirect and that this specification is not intended to be limiting in this respect.

A gaming machine according to one or more aspects of the invention will be described in detail with reference to the drawings based on an embodiment embodying one or more aspects of the invention as a card game machine. However, it is appreciated that one or more aspects of the present invention may be embodied in distributable (via CD and the like) or downloadable software games, console games, and the like. In this regard, the slot machine may be a virtual slot machine that is displayed on a multi-purpose computer and/or dedicated kiosk. Aspects of the invention are described by way of hardware elements. However, it is appreciated that these elements may also be software modules that are executable in a computer. The software modules may be stored on a computer readable medium, including but not limited to a USB drive, CD, DVD, computer-readable memory, tape, diskette, floppy disk, and the like. For instance, aspects of the invention may be embodied in a JAVA-based application or the like that runs in a processor or processors. Further, the terms "CPU" and "processor" are inclusive by nature, including at least one of hardware, software, or firmware.

These terms may include a portion of a processing unit in a computer (for instance, in multiple core processing units), multiple cores, a functional processor (as running virtually on at least one of processor or server, which may be local or remote). Further, in network-based gaming systems, the processor may include only a local processor, only a remote server, or a combination of a local processor and a remote server. It is contemplated that one or more aspects of the invention may be implemented as computer executable instructions on a computer readable medium such as a non-volatile memory, a magnetic or optical disc. Further, one or more aspects of the invention may be implemented with a carrier signal in the form of, for instance, an audio-frequency, radio-frequency, or optical carrier wave.

An embodiment embodying one or more aspects of the invention as a slot machine will be described with reference to drawings. Here, the slot machine of the embodiment has an image display device such as a liquid display or the like, and executes games by displaying images of various symbols on the image display device. That is, the slot machine of the embodiment is the video slot machine.

In the slot machine of the embodiment, if the same symbols are displayed on a payline on a display device with a predetermined number or more, it will be determined that a winning combination is realized. Further, after all spinning reels are stopped and symbols are displayed in each symbol display area, if it is determined that the winning combination will be newly realized in a case where any of symbols is displayed on another symbol display area, the symbol is enlarged displayed and it is determined that the winning combination is realized.

For example, FIG. 1 shows that one or more aspects of the invention are applied to the slot machine having five reels 23 to 27 on the display device. If a game is started in the slot machine, as shown in upper column of FIG. 1, symbol rows are scrolling displayed on each of the reels 23 to 27. And then, if a predetermined time is elapsed, the spinning reels 23 to 27 are stopped from the left, and fifteen symbols 46 (at maximum) are displayed in each of the symbol display area.

Here, in a case where that it is defined that three or more "HEART" symbols are displayed on the payline, it is determined that the winning combination is not realized at the timing shown in middle column of FIG. 1. However, it will be determined that the winning combination is newly realized in the case where the "HEART" symbols 71, 72, and 73 displayed on the reels 23, 24, and 25 are displayed on another symbol display area of the same reel. Consequently, as shown in bottom column of FIG. 1, the "HEART" symbols 71, 72, and 73 are enlarged to display another symbol display area of the same reel, and made up an enlarged symbol 74. Accordingly, an award corresponding to the winning combination of the three "HEART" on the payline will be provided.

Figure 2:
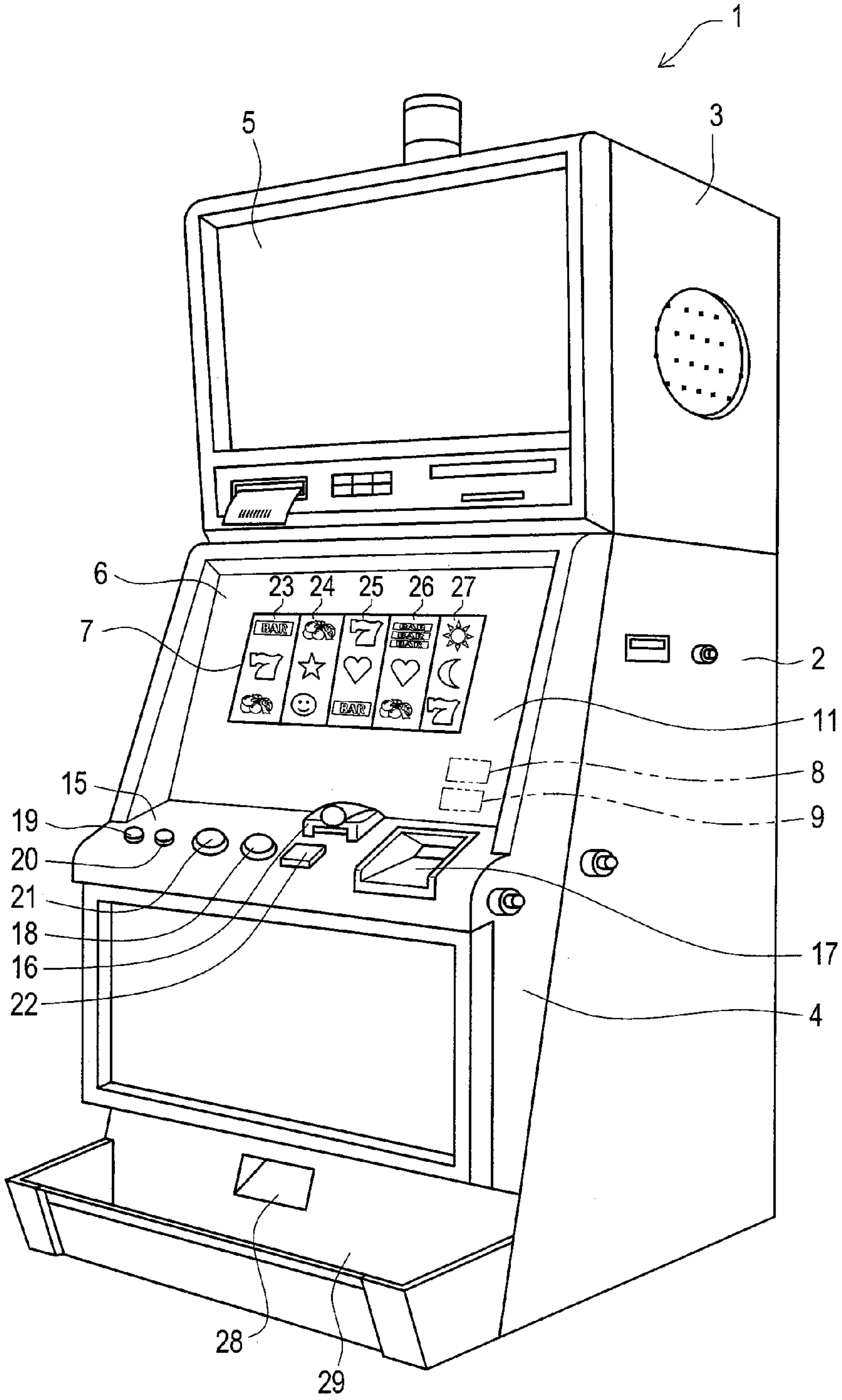
FIG. 2 is a perspective view showing the slot machine in accordance with one or more aspects of the present invention.

At first, a construction of the slot machine 1 of the embodiment will be described with reference to FIG. 2. FIG. 2 is a perspective view showing the slot machine 1 of the embodiment.

The slot machine 1 of the embodiment may include a cabinet 2, a top box 3, and a main door 4. The top box 3 is arranged on the cabinet 2 (for instance, arranged on upper side). The main door 4 may be arranged at front of the cabinet 2.

An upper display 5 may be arranged with the slot machine 1 (for example, arranged in front of the top box 3). The upper display 5 may be constructed from the display device (for example, LCD panel). Methods of the games and payout tables, or the like may be displayed on the upper display 5.

A lower display 6 may be arranged with the slot machine 1 (for example, arranged in front of the main door 4). The lower display 6 may be constructed from the display device (for example, LCD panel), and may include symbol display portion 7. The symbol display portion 7 may constructed from five reels 23 to 27. Symbol rows on which symbols are aligned with predetermined order may be scrolling displayed. And then, when the predetermined time is elapsed, each of three symbols (at maximum) is displayed on each reel. At a result, fifteen symbols (at maximum) are displayed according to game session (which will be described later), and a predetermined award will be provided based on the displayed symbols. Here, the number of the reels is variable. For example, the number of the reels may be three. Also, the number of the symbols is variable. For example, the number of the symbols may not be fifteen.

A touch panel 11 may be arranged in front of the lower display 6. The player can input various instructions by operating the touch panel 11.

A credit number display portion 8, a payout number display portion 9 may be arranged on the lower display 6. The credit number, in which the player currently owns, may be displayed on the credit number display portion 8. The payout number to be provided when a combination of displayed symbols on payline is any of predetermined combinations may be displayed on the payout number display portion 9.

A control panel 15, a coin insertion slot 16, and a bill insertion portion 17 may be arranged at the lower display 6 (for example, arranged on lower side). Buttons are arranged at the control panel 15. The buttons are the buttons to input the instructions for gaming session by the player. The coin insertion slot 16 may receive the gaming medium into the cabinet 2.

A start button 18, a change button 19, a cash out button 20, a 1-bet button 21, and a max-bet button 22 may be arranged on the control panel 15. The start button 18 may be used when the instruction for the start of the scrolling displayed symbol rows on reels 23 to 27 is input. Here, a physical lever may be used as substitute for the start button 18. Also, the physical lever may be used in conjunction with the start button 18. The change button 19 is used when the exchange is required. The cash out button 20 may be used when the instruction for the payment of the coin (for example, one credit is equal to one coin) or for the print a ticket is input. One or more bar codes may be printed on the ticket. The ticket may be called GAMING VOUCHER. The coin may be paid through a coin payout opening 28 to a coin tray 29. Here, other than bar code may be used as substitute for the bar code (for example, QR Code (two-dimensional bar code)).

The 1-bet button 21 is used when the instruction for the bet one credit from the player's credits. The max-bet button 22 is used when the instruction for the bet available maximum bet count in one game (for example, fifteen credits) is input. Here, various bet buttons (for example, 3-bet button) may be arranged.

In the slot machine 1 of the embodiment, the gaming medium may be coin, bill, or electronic value (credit). Here, the gaming medium may be other things as well (including but not limited to medal, token, electronic money, or ticket).

Figure 3:
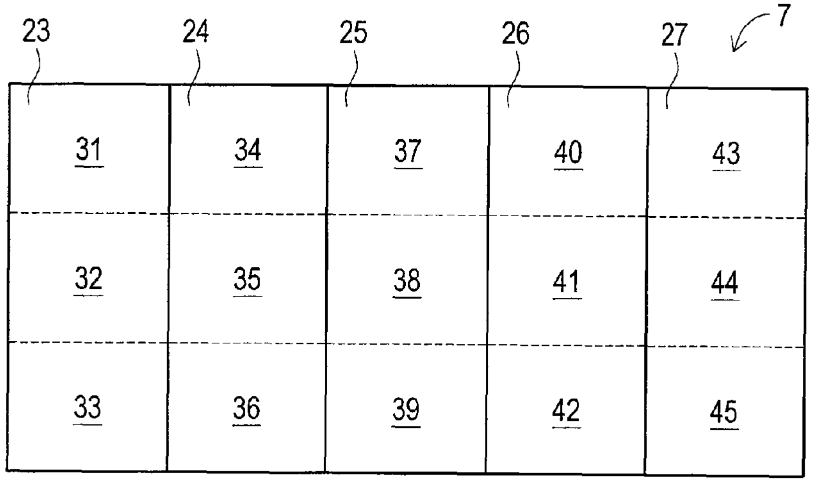
FIG. 3 is a front view showing a symbol display area in accordance with one or more aspects of the present invention.
Figure 4:
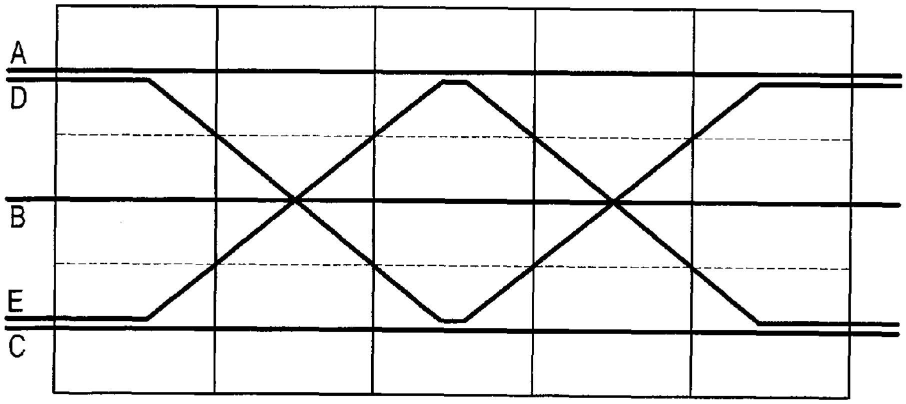
FIG. 4 is a view showing paylines A to E which are set by the slot machine in accordance with one or more aspects of the present invention.
Figure 5:
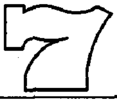
FIG. 5 is a view showing a list of symbols and awards in accordance with one or more aspects of the present invention.
Figure 5:
Figure 5:
Figure 5:
Figure 5:
Figure 5:
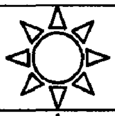
Figure 5:
Figure 5:
Figure 5:
Figure 5:

Symbols displayed in the symbol display portion 7 on the lower display 6 in the gaming session will be described with reference to FIGS. 1, 3 to 5. FIG. 3 is a front view showing the symbol display portion 7 in the embodiment. FIG. 4 is a front view showing the paylines A to E used in the slot machine of the embodiment. FIG. 5 is a view showing symbols and awards by a list.

As shown in FIG. 3, the symbol display portion 7 of the embodiment may be constructed from five reels 23 to 27. The reels 23 to 27 include the symbol display areas 31 to 45. Each of three symbols is displayed in each of symbol display areas. When the game is started, each of symbols (for example, fifteen symbols) is displayed in each of the symbol display areas 31 to 45. Here, in the embodiment, dot-lines are divided symbol display areas 31 45 to separate, however, the dot-lines may not be displayed.

The symbols used in the slot machine 1 of the embodiment include ten kinds of symbols 46 and blank (blank symbol). Here, the number of symbols and the kinds of the symbols are variable.

In the slot machine 1 of the embodiment, if the same symbols 46 are positioned on five paylines A to E which are predefined shown in FIG. 4 with the predetermined number or more, it is determined that the winning combination is realized and the award corresponding thereto will be provide. Also, if three or more "7" symbols are positioned on the payline, it is determined that a bonus combination is realized and a bonus game will be ongoing executed after the base game is finished.

In the embodiment, if the same symbols 46 are positioned on paylines shown in FIG. 4 with the predetermined number, the winning combination is realized and the award corresponding thereto will be provided. Here, if the same symbols are positioned on symbol display areas 31 to 45 with predetermined number or more regardless of the paylines, it can be determined that the winning combination is realized. Also, both the award based on the payline and the award not based on the payline can be provided.

Procedures of the game session in the slot machine of the embodiment will be described. At first, the start button 18 is pressed after the bet acceptance, the lottery process is executed. In the lottery process, the symbols to be positioned in the symbol display portion 7 are determined by lottery. When the predetermined time is elapsed from the point at which the start button 18 is pressed, the reels 23 to 27 will start to spin and the symbol rows are scrolling displayed. And then, the predetermined time is elapsed, total of fifteen symbols 46 are gradually stopped on symbol display areas 31 to 45. If it is determined that the winning combination will be newly realized in a case where any of symbols (among displayed symbols) is displayed on another symbol display area in the same reel, the symbol is enlarged over all of symbol display areas of the repositioned reel (for example, the symbol positioned in reel 23 will enlarged over the symbol display areas 31 to 33). After that, the content of the award is determined based on the combination of the symbols including the enlarged symbol, and the determined award is provided.

Figure 6:
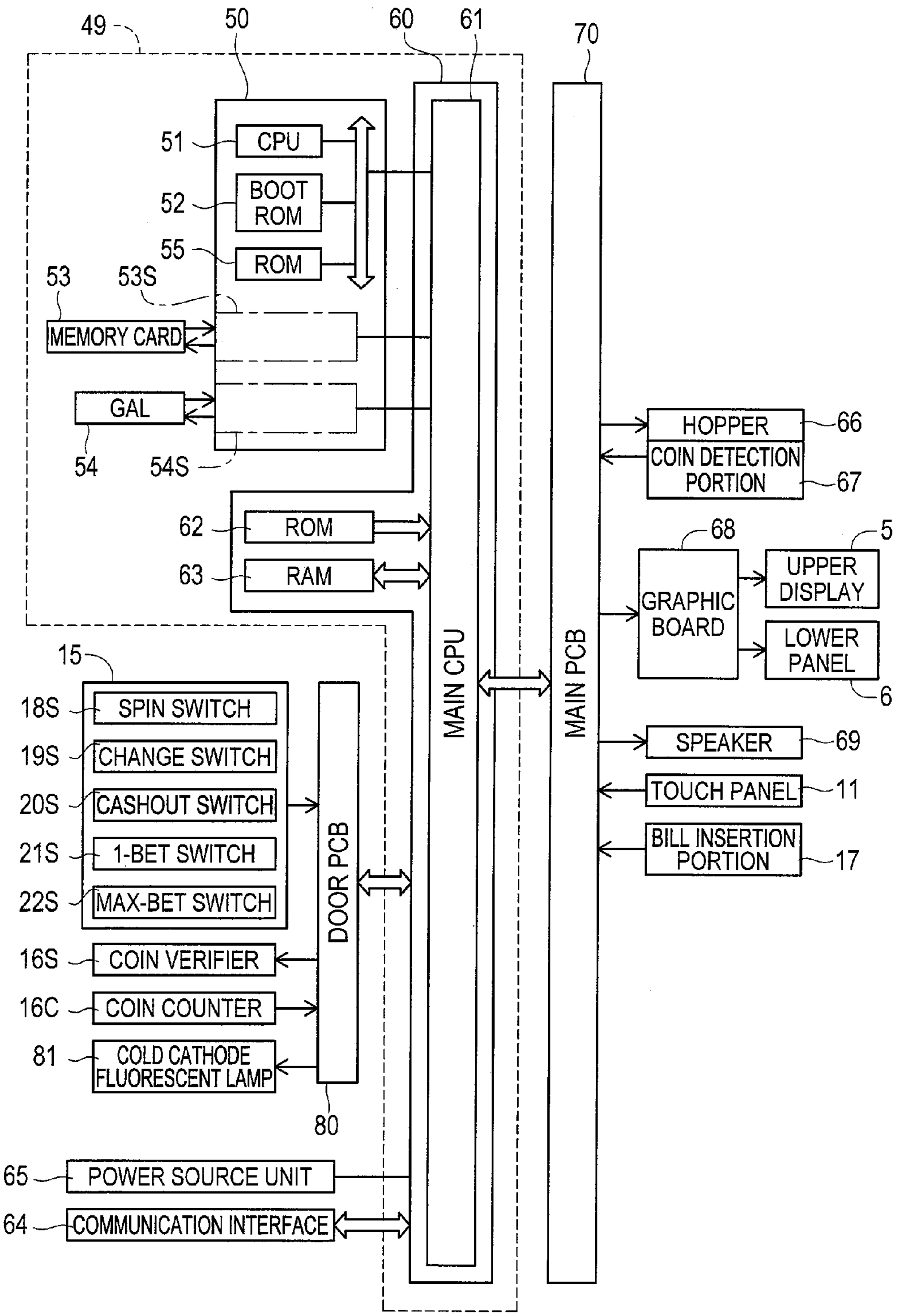
FIG. 6 is a block diagram schematically showing a control system of the slot machine in accordance with one or more aspects of the present invention.

A control system of the slot machine 1 of the embodiment will be described with reference to FIG. 6. FIG. 6 is a block diagram schematically showing the control system of the slot machine 1 of the embodiment.

The control system of the slot machine 1 may be constructed from a mother board 60 and a gaming board 50 as shown in FIG. 6. The mother board 60 and the gaming board 50 make up a controller 49. The controller 49 executes control programs (FIGS. 7 and 8) or the like which will be described later.

The gaming board 50 will be described. The gaming board 50 may include a CPU 51, a ROM 55, a boot ROM 52, a card slot 53S, and an IC socket 54S. The CPU 51, the ROM 55, and the boot ROM 52 are interconnected via internal bus. A card slot 53S is adapted to connect the memory card 53. An IC socket 54S is adapted to connect a GAL (Generic Array Logic) 54. Here, PLD (Programmable Logic Device) which is other than the GAL 54 may be substituted for the GAL 54.

The memory card 53 may be constructed from non-volatile memory. Game programs and game system programs (hereinafter, "the game program and the like") may be stored therein. The game programs stored in the memory card 53 may include lottery program. The lottery program may be used when the symbols to be displayed in the symbol display areas 31 to 45 are determined.

A symbol lottery table is stored in the memory card 53. The symbol lottery table is used when the symbols to be displayed on the symbol display areas 321 to 45 are determined by lottery. In the symbol lottery table, each predetermined range of random numbers corresponds to ten kinds of symbols 46 and the blank symbol to be displayed in the symbol display areas 31 to 45. The symbols 46 to be displayed in the symbol display areas 31 to 45 are determined based on the symbol lottery table, and then the award to be provided to the player based on the combination of the determined symbols.

Here, in the symbol lottery table, the predetermined range of random number may correspond to the award to be provided to the player. In this case, at first, the award to be player is determined based on the symbol lottery table. After that, the combination of the symbols 46 corresponding to the determined award is selected by the main CPU 61.

The mother board 60 will be described. The mother board 60 may be constructed from general mother board (printed circuit board which mounts basic components), and may include a main CPU 61, a ROM 62, a RAM 63, and a communication interface 64.

The ROM 62 may be constructed from a memory device such as the flash memory (for example). The preliminary data such as BIOS program may be stored in the ROM 62. The BIOS program can be executed by the main CPU 61. If the BIOS is executed by the main CPU 61, initial processes for predetermined peripheral devices, and read processes for the game programs and the like stored in the memory card 53 will be started via the gaming board 50.

The data and the program, which are used when the main CPU 61 runs, are stored in the RAM 63. The verification program (which will be read via the gaming board 50), various programs (such as the game program and the like), and the number of the player's credits may be stored in the RAM 63.

The communication interface 64 may be used when the main CPU 61 communicates with the server or the like located in the game hall via the communication line.

A main PCB (Printed Circuit Board) 70 and a door PCB 80 (which will be described later) are connected to the mother board 60 respectively via USB (for example). A power source unit 65 is connected to the mother board 60. If the power source unit 65 supplies the electric power to the mother board 60, the main CPU 61 on the mother board 60 will be booted up. When the electric power is supplied to the gaming board 50, the CPU 51 will be booted up.

A hopper 66, a coin detection portion 67, a graphic board 68, a loudspeaker 69, a touch panel 11, a bill insertion portion 17 may be connected directly or indirectly to the main PCB 70.

The graphic board 68 controls display images on the upper display 5 and the lower display 6 based on the control signal from the main CPU 61. The payout table and a help screen may be displayed on the upper display 5. The reels 23 to 27 are spun, and the symbols 46 are scrolling displayed and then stopped displayed. Also, if the stopped displayed symbols 46 meet the predetermined condition, the symbol displayed in a predetermined symbol display area will be enlarged (see FIG. 1).

A control panel 15, a coin verifier 16S, and a coin counter 16C are directly or indirectly connected to the door PCB 80. Here, a cold cathode fluorescent lamp 81 may be connected to the door PCB 80. A start switch 18S, a change switch 19S, a cash-out switch 20S, a 1-bet switch 21S, and a max-bet switch 22S are arranged on the control panel 15. The start switch 18S is associated with the start button 18. The change switch 19S is associated with the change button 19. The cash-out switch 20S is associated with the cash-out button 20. The 1-bet switch 21S is associated with the 1-bet button 21. The max-bet switch 22S is associated with the max-bet button 22. Each of switches may output the input signal to the main CPU 61 when the button corresponding thereof is operated by the player.

Figure 7:
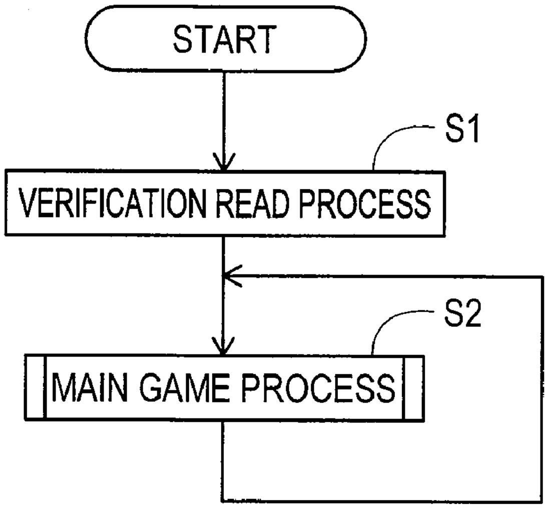
FIG. 7 is a flowchart of a control process program of the slot machine in accordance with one or more aspects of the present invention.

A main control program, which is executed in the slot machine 1 of the embodiment, will be described in detail with reference to the drawing. FIG. 7 is a flowchart of the main control program.

Concerning the slot machine 1, the memory card 53 is connected to the card slot 53S of the gaming board 50, and the GAL 54 is connected to the IC socket 54S.

When the power switch of the power source unit 65 is ON, the mother board 60 and the gaming board 50 are respectively booted-up, and the verification read process (S1) is executed. In the verification read process, the mother board 60 and the gaming board 50 execute separate processes in parallel.

In the gaming board 50, the CPU 51 reads the preliminary verification program from the boot ROM 52, and verifies that the verification program is not falsified before the verification program is taken to the mother board 60.

In the mother board 60, the main CPU 61 executes BIOS stored in the ROM 62, and checks and initializes various peripheral devices. Here, BIOS may be compressed, then, BIOS is decompressed. BIOS may be copied to the RAM 63.

The main CPU 61 reads the verification program stored in the ROM 55, and verifies that game program and the like are not falsified. Here, the game program and the like is stored in the memory card 53 which is inserted to the card slot 53S. After the verification process is normally ended, the main CPU 61 writes authenticated program to the RAM 63. The payout ratio setting data is read from the GAL 54 via the gaming board 50, and the payout ratio setting data which is read is written to the RAM 63.

After the process mentioned above is finished, the main CPU 61 finishes the verification read process.

In S2, the main CPU 61 reads the game program and the like which was verified in S1 from the RAM 63, and executes the main game process. The game in the slot machine 1 of the embodiment is executed by executing the main game process. The main game process is executed repeatedly during the electronic power source is supplied to the slot machine 1.

Figure 8:
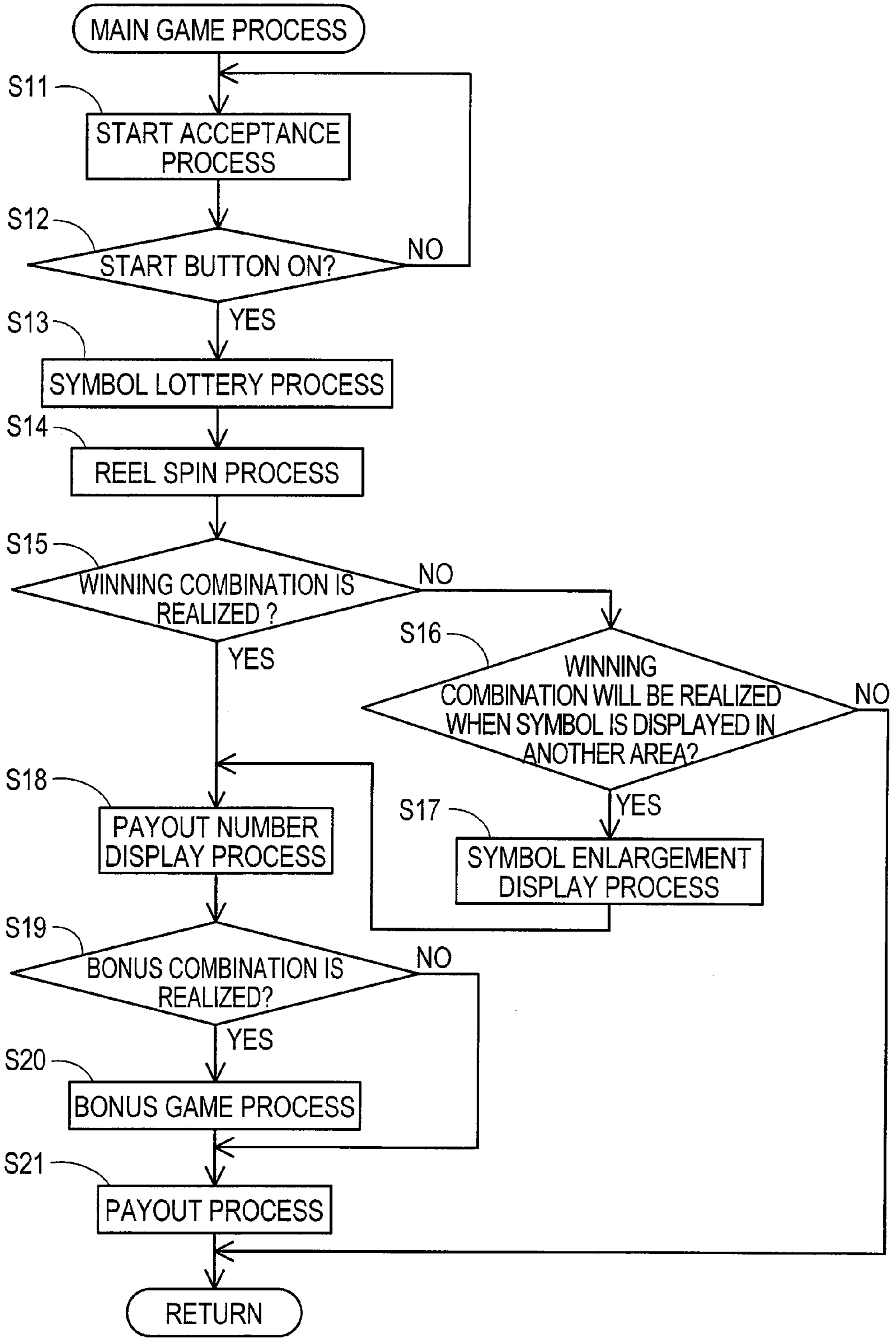
FIG. 8 is a flowchart of a main game process program of the slot machine in accordance with one or more aspects of the present invention.

A sub process of the main game process in S2 will be described with reference to FIG. 8. FIG. 8 is a flowchart of the main game process in the slot machine 1 of the embodiment. Here, each of the programs shown in the flowcharts of FIG. 8 is stored in the memory card 53. The programs are decompressed to the RAM 63 of the controller 49, and decompressed programs are executed by the main CPU 61.

In S11, the main CPU 61 performs predetermined initial setting, and then, executes the start acceptance process as shown in FIG. 8. The coin is inserted and the bet value for the payline is set during the start acceptance process. Also, during the start acceptance process, various data which is set in a predetermined data area (for example, payout number counter) is cleared. Further, during the start acceptance process, the coin is inserted by the player, or the bet operation to bet from 1 bet to 50 bets with the use of the 1-bet button 21 or max-bet button 22 is operated by the player.

In S12, the main CPU 61 determines whether or not the start button 18 is operated. It is determined whether or not the start button 18 is operated based on that whether or not the input signal from the start switch 18S is received.

If it is determined that the start button 18 is not operated (S12:NO), the procedure will be returned to the start acceptance process (S11) again. In that time, some instructions such as to change the bet number are available. On the other hand, if the start button 18 is operated (S12:YES), the bet number which is set for the payline based on the operation of 1-bet button 21 or max-bet button 22, will be subtract from credit count in which the player owns. And, the bet number will be stored in RAM 63 as the bet information.

In S13, the main CPU 61 executes the symbol lottery process. In the symbol lottery process, the symbols to be displayed in each symbol display area 31 to 45 in the symbol display portion 7 are determined by lottery. Concretely, the main CPU 61 executes random number value generation program included in lottery program stored in the RAM 63, at result, the random numbers are generated from the predetermined range of the random number value. And then, fifteen symbols to be displayed in the symbol display areas 31 to 45 (namely, the stop position of reels 23 to 27) is determined among ten kinds of symbols based on the samples random number values and the symbol lottery table.

In S14, the main CPU 61 starts to spin reels 23 to 27, and the symbol rows on which each of reels 23 to 27 positioned are scrolling displayed at a predetermined speed. After that, when the predetermined time is elapsed, spinning reels 23 to 27 are stopped from the left, each and one symbol is displayed in each of the symbol display areas 31 to 45 (see FIG. 1).

In S15, the main CPU 61 determines whether or not the combination of the symbols 46 displayed on the symbol display areas 31 to 45 is any of the winning combination corresponding to the award to be provided.

If it is determined that the combination is any of the winning combination (S15:YES), the procedure will be shifted to S18. On the other hand, if it is determined that the combination is none of the winning combination (S15:NO), it is determined whether or not the winning combination will be newly realized in the case where any of symbols is displayed on another symbol display area in the same reel (S16).

In the slot machine 1 of the embodiment, it is determined whether or not the combination of the symbols displayed in the symbol display areas 31 to 45 including a predetermined symbol (stop symbol) in a case where the stop symbol is displayed on other symbol display areas in the same reel in which the stop symbol is positioned (for example, if the stop symbol is displayed in the symbol display area 37, the other symbols display areas are the symbol display areas 38 and 39).

In S16, if it is determined that the winning combination will be newly realized in the case where the stop symbol is displayed in other symbol display area (S16:YES), the symbol will be enlarged displayed in the area including the symbol display area of the stop symbol and the other symbol display area (S17). At a result, the enlarged symbol is displayed in all of the symbol display areas of the reel in which the stop symbol is displayed. Also, if plural stop symbols are exist and the plural stop symbols are adjacently displayed, the enlarged symbol is displayed in all of the symbol display areas of the adjacent reel. For example, in FIG. 1, “HERAT” symbols 71 to 73 is the stop symbols and the reels 23 to 25, on which the stopped symbol are displayed, are adjacent, the stop symbol is enlarged over the all of the symbol display areas 31 to 39 of the reels 23 to 25.

On the other hand, in S16, if it is determined that the winning combination will not be realized even though the symbol is displayed in the other symbol display area in the same reel (S16:NO), the main game process will be finished. If the game is ongoing started continuously, the process of S1 and after will be executed again.

In S18, the main CPU 61 notifies the content of the award to the player by displaying the award corresponding to the realized winning combination on the lower display 6. For example, the bet number is one and five "CHERRY" symbols are displayed on the payline, the text of "Win 15" indicating that 15 credits will be provided as the award is displayed.

In S19, it is determined whether or not the combination of the symbols displayed in the symbol display areas 31 to 45 based on the reel spin process of S14 realizes any of the winning combination. Here, the winning combination is the combination of three or more "7" symbols on the paylines A to E.

If it is determined that the winning combination is realized (S19:YES), the procedure will be shifted to the bonus game (S20). The bonus game may be various games, however, in this embodiment, it will be described that the free game is the bonus game. In the free game, the games, which are the same as the base game, are executed without the bet operation with predetermined times. In the bonus game of S20, the reels 23 to 27 are spin and stopped with predetermined times, the awards, which are realized during the bonus games, will be provided in a payout process of S21 which will be described later. Also, during the free game, the symbols can be enlarged (S16 and S17) the same as the base game. Here, a lottery table used in the free game may be set so that higher payout will be provided compared to the base game.

On the other hand, if it is determined that the bonus combination is not realized (S19:NO), the procedure will be shifted to S21.

In S21, the main CPU 61 provides the award corresponding to the combination of the displayed symbols. Here, if the player presses the cashout button 20, the coins in which the number of the coins corresponds to the credit count (for example, 1 credit count corresponds to 1 coin) may be provided. Also, the ticket with barcode may or may not be provided.

As mentioned above, in the slot machine 1 of the embodiment, the bet number of the current game is accepted any of from 1 bet to 50 bets based on the player's operation with the use of the 1-bet button 21 and/or the max-bet button 22 when the game is started (S11). After that, the reels 23 to 27 starts spinning, and then when the predetermined time is elapsed, total of fifteen symbols 46 are displayed in the symbol display areas 31 to 45 (S14). In this time, if it is determined that the winning combination will be newly realized in a case where any of symbols is displayed on another symbol display area (S16:YES), the stop symbol is enlarged displayed in the areas including both the symbol display area where the stop symbol is displayed and the other symbol display areas in the same reels (S17). And then, the award corresponding to the realized winning combination will be provided to the player (S21). Thereby, without disturbing the visibility based on complex image effects, the entertainment will be enhanced based on the image effects with higher visibility. Because the chance of realizing the winning combination is provided again by enlarging the stopped symbols, the sense of anticipation for realizing the winning combination will be enhanced. Further, various effects can be performed without the constraint in which the size of the symbol 46 is constrained by the size of the reels 23 to 27.

Here, aspects of the present invention are not limited to the above embodiment and various changes and modification can be done within the scope of the present invention.

Figure 9:
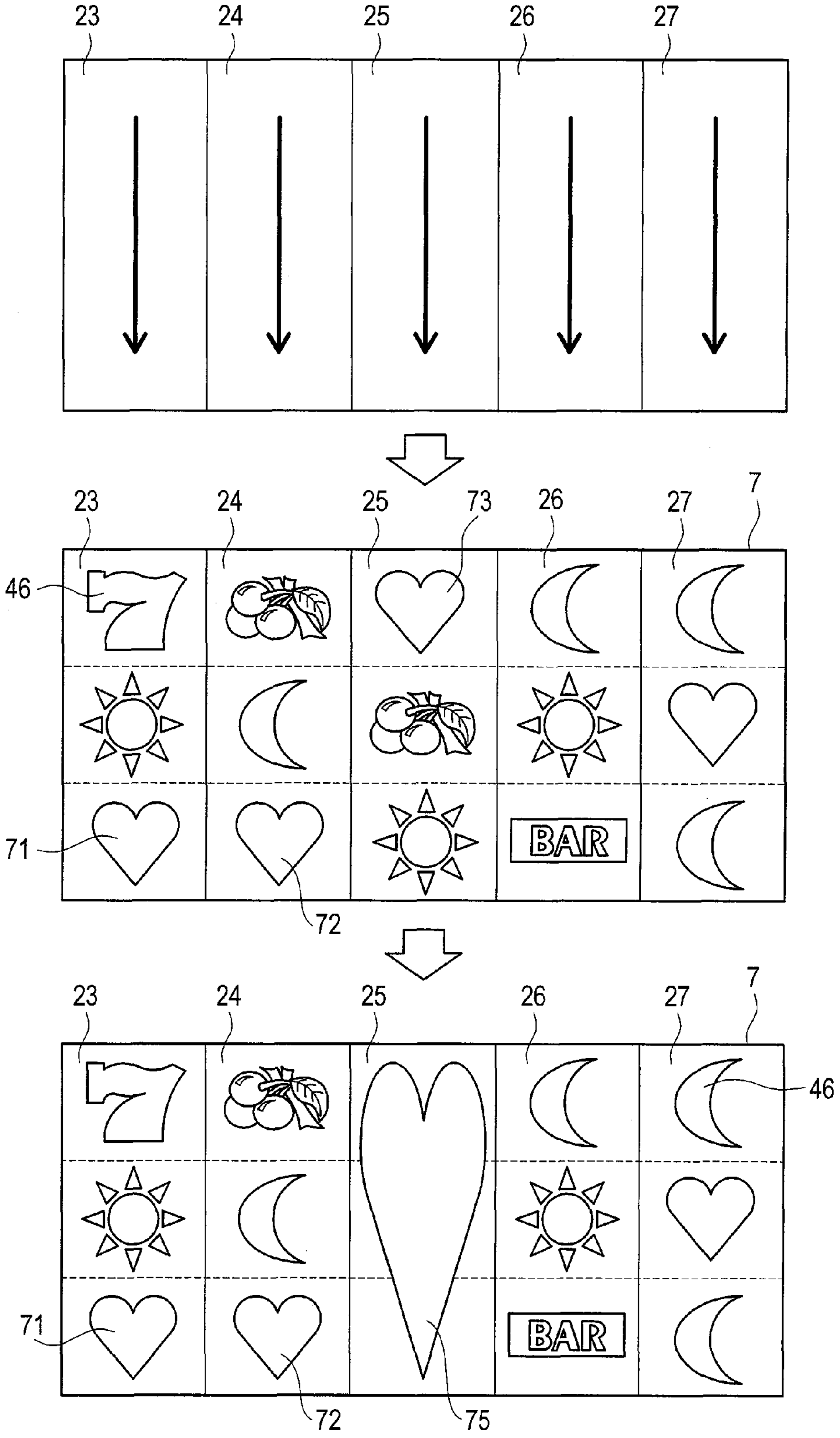
FIG. 9 is a view showing another feature of a slot machine in accordance with one or more aspects of the present invention.

For example, in the embodiment, the reels to be the target for enlarging are all of the reels 23 to 27 displayed on the lower display 6. However, the invention is not so limited. For example, only predetermined reel can be the target for enlarging. FIG. 9 shows a case where the reel 25 is only the target for enlarging.

In the slot machine shown in FIG. 9, when the game is started, symbol rows are scrolling displayed in each reel 23 to 27 shown in upper column of FIG. 9. When the predetermined time is elapsed, the spinning reels 23 to 27 is stopped from the left and fifteen (at maximum) symbols 46 are displayed in the each symbol display area. Here, in a case where the winning combination will be realized when three or more "HEART" symbols are stopped on the payline, it is determined that the winning combination is not realized at the time point when the reels are stopped shown in middle column of FIG. 9. However, it is determined that the winning combination will be realized in the case where the "HEART" symbol 73 displayed in the reel 25 is displayed in the other symbol display areas 38 and 39 of the same reel 25 (S16). Thereby, as shown in lower column of FIG. 9, the enlarged symbol 75, in which the "HEART" symbol 73 is enlarged over the other symbol display areas 38 and 39 of the same reel 25, is displayed. At a result, the award corresponding to three "HEART" symbols on the payline C will be provided.

In the embodiment, if it is determined that the winning combination will be newly realized in the case where stopped symbols is displayed in other symbol display area in the same reel, symbol enlargement process (S16 and S17) is executed in both the base game and the bonus game. However, the invention is not so limited. For example, the symbol enlargement process may not be executed in the base game and the symbol enlargement process may be executed in only the bonus game. Also, the number of reels to be target for enlarging symbols may be different between the base game and the bonus game. For example, only the reel 25 may be the target in the base game and all of the reels 23 to 27 may be the target.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A gaming machine comprising:

a display having symbol display areas, each of the symbol display areas displaying a symbol; and a controller programmed to:

(a) display each of the symbols on each of the symbol display areas, (b) determine whether a combination of the displayed symbols becomes a winning combination if a predetermined displayed symbol is displayed on another symbol display area, (c) enlarge and display the predetermined displayed symbol on both the symbol display area where the predetermined displayed symbol is displayed and the another symbol display area if the winning combination is realized, and (d) provide an award based on the realized winning combination.

2. A gaming machine comprising:

a display having symbol display areas, each of the symbol display areas displaying a symbol;

reels, each of the reels having symbols; and a controller programmed to:

(a) display each of the symbols corresponding to one of the reels on each of the symbol display areas, (b) determine whether a combination of the displayed symbols becomes a winning combination if a predetermined displayed symbol is displayed on another symbol display area, (c) enlarge and display the predetermined displayed symbol on both the symbol display area where the predetermined displayed symbol is displayed and the another symbol display area on the reel corresponding to the predetermined displayed symbol if the winning combination is realized, and (d) provide an award based on the realized winning combination.

3. A gaming machine comprising:

a display having symbol display areas, each of the symbol display areas displaying a symbol;

reels, each of the reels having symbols; and a controller programmed to:

(a) display each of the symbols corresponding to one of the reels on each of the symbol display areas, (b) enlarge and display a predetermined displayed symbol on both the symbol display area where the predetermined displayed symbol is displayed and another symbol display area, (c) determine whether a combination of the displayed symbols becomes a winning combination if the displayed symbols is displayed on the another symbol display area, and (d) provide an award based on the realized winning combination.

4. The gaming machine according to claim 3, further comprising:

reels, each of the reels having the symbols;

wherein the controller enlarges and displays a predetermined displayed symbol on both the symbol display area where the predetermined displayed symbol is displayed and the another symbol display area on one of the reels corresponding to the predetermined displayed symbol.

5. A gaming method conducted in a gaming machine, the gaming machine including a display having symbol display areas, each of the symbol display areas configured to display a symbol, and a controller configured to control the display, the gaming method comprising:

(a) displaying each of the symbols on each of symbol display areas;

(b) determining whether a combination of the displayed symbols becomes a winning combination if a predetermined displayed symbol is displayed on another symbol display area;

(c) enlarging and displaying the predetermined displayed symbol on both the symbol display area where the predetermined displayed symbol is displayed and the another symbol display area if the winning combination is realized; and (d) providing an award based on the realized winning combination.

6. A gaming method conducted in a gaming machine, the gaming machine including a display having symbol display areas, each of the symbol display areas configured to display a symbol, reels in which each of the reels including symbols, and a controller configured to control the display, the gaming method comprising:

(a) displaying each of the symbols corresponding to each of reels on each of symbol display areas;

(b) determining whether a combination of the displayed symbols becomes a winning combination if a predetermined displayed symbol is displayed on another symbol display area;

(c) enlarging and displaying the predetermined displayed symbol on both the symbol display area where the predetermined displayed symbol is displayed and the another symbol display area on the reel corresponding to the predetermined displayed symbol if the winning combination is realized; and (d) providing an award based on the realized winning combination.

* * * * *